United States Patent
Zhao et al.

(10) Patent No.: US 10,362,042 B2
(45) Date of Patent: Jul. 23, 2019

(54) METHOD FOR TRANSMITTING VERIFICATION INFORMATION AND TERMINAL

(71) Applicant: Huawei Technologies Co., Ltd., Shenzhen (CN)

(72) Inventors: Xiaona Zhao, Beijing (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 15/518,062

(22) PCT Filed: Oct. 22, 2014

(86) PCT No.: PCT/CN2014/089196
§ 371 (c)(1),
(2) Date: Apr. 10, 2017

(87) PCT Pub. No.: WO2016/061769
PCT Pub. Date: Apr. 28, 2016

(65) Prior Publication Data
US 2017/0310685 A1 Oct. 26, 2017

(51) Int. Cl.
*H04L 29/06* (2006.01)
*G06Q 20/40* (2012.01)
(Continued)

(52) U.S. Cl.
CPC ............ *H04L 63/123* (2013.01); *G06F 21/35* (2013.01); *G06Q 20/3278* (2013.01);
(Continued)

(58) Field of Classification Search
CPC . H04L 63/123; H04W 12/06; G06Q 20/3278; G06F 21/35
See application file for complete search history.

(56) References Cited

U.S. PATENT DOCUMENTS 8,321,922 B1 11/2012 Yung et al.
2006/0193606 A1* 8/2006 Lamkin ................. H04N 5/765
386/355
(Continued)

FOREIGN PATENT DOCUMENTS

CN 101916478 A 12/2010
CN 102868527 A 1/2013
(Continued)

OTHER PUBLICATIONS

Alshahrani et al., "NFC performance in mobile payment service compared with a SMS-based solution," 2013 International Conference on Green Computing, Communication and Conservation of Energy (ICGCE) Year: 2013 pp. 282-286.*
(Continued)

*Primary Examiner* — Roderick Tolentino
(74) *Attorney, Agent, or Firm* — Conley Rose, P.C.

(57) ABSTRACT

A method for transmitting verification information includes: detecting, by a first terminal, whether a condition for performing a verification operation is satisfied; generating, by the first terminal, a verification information obtaining request if the condition for performing a verification operation is satisfied, where the verification information obtaining request is used to request a second terminal to feed back verification information; sending, by the first terminal, the verification information obtaining request to the second terminal; receiving, by the first terminal, a verification information obtaining response returned by the second terminal, where the verification information obtaining response includes the verification information; and sending, by the first terminal, the verification information to a server, where the verification information is used for the server to verify the first terminal.

14 Claims, 6 Drawing Sheets

(51) Int. Cl.
  *G06F 21/35* (2013.01)
  *G06Q 20/32* (2012.01)
  *H04W 12/06* (2009.01)
  *H04W 4/80* (2018.01)

(52) U.S. Cl.
  CPC ............ *G06Q 20/40* (2013.01); *H04W 12/06* (2013.01); *H04W 4/80* (2018.02)

(56) References Cited

U.S. PATENT DOCUMENTS

| | | | |
|---|---|---|---|
| 2006/0294235 A1* | 12/2006 | Joseph | G06Q 10/06 709/225 |
| 2007/0214454 A1* | 9/2007 | Edwards | G06F 16/957 717/176 |
| 2010/0151823 A1 | 6/2010 | Dagorn et al. | |
| 2012/0110515 A1* | 5/2012 | Abramoff | G06F 16/904 715/854 |
| 2013/0054678 A1* | 2/2013 | Williams | G06F 17/243 709/203 |
| 2013/0311313 A1* | 11/2013 | Laracey | G06Q 20/3278 705/16 |
| 2014/0026202 A1 | 1/2014 | Lo et al. | |
| 2014/0068746 A1* | 3/2014 | Gonzalez Martinez | H04L 63/0884 726/9 |
| 2014/0179361 A1* | 6/2014 | Kotreka | H04M 3/42382 455/466 |
| 2014/0181955 A1 | 6/2014 | Rosati | |
| 2015/0017955 A1* | 1/2015 | Canto Fuertes | H04Q 3/72 455/414.1 |
| 2016/0028741 A1 | 1/2016 | Zhang et al. | |
| 2016/0203468 A1* | 7/2016 | Chen | G06Q 20/3274 705/75 |

FOREIGN PATENT DOCUMENTS

| | | |
|---|---|---|
| CN | 103259664 A | 8/2013 |
| CN | 103546877 A | 1/2014 |
| CN | 103942685 A | 7/2014 |
| CN | 103971427 A | 8/2014 |
| CN | 103973442 A | 8/2014 |
| CN | 104104514 A | 10/2014 |
| JP | 2008547100 A | 12/2008 |
| JP | 2011071615 A | 4/2011 |
| JP | 2014530410 A | 11/2014 |
| KR | 20130008123 A | 1/2013 |
| KR | 101226607 B1 | 2/2013 |

OTHER PUBLICATIONS

Benyo et al., "A novel virtual machine based approach for hosting NFC services on mobile devices," WMNC2010 Year: 2010 pp. 1-7.*
Machine Translation and Abstract of Japanese Publication No. JP2011071615, Apr. 7, 2011, 12 pages.
Foreign Communication From a Counterpart Application, Japanese Application No. 2017-516934, Japanese Office Action dated May 8, 2018, 3 pages.
Foreign Communication From a Counterpart Application, Japanese Application No. 2017-516934, English Translation of Japanese Office Action dated May 8, 2018, 5 pages.
Machine Translation and Abstract of Chinese Publication No. CN101916478, Dec. 15, 2010, 8 pages.
Machine Translation and Abstract of Chinese Publication No. CN102868527, Jan. 9, 2013, 10 pages.
Machine Translation and Abstract of Chinese Publication No. CN103259664, Aug. 21, 2013, 18 pages.
Machine Translation and Abstract of Chinese Publication No. CN103546877, Jan. 29, 2014, 11 pages.
Machine Translation and Abstract of Chinese Publication No. CN103942685, Jul. 23, 2014, 32 pages.
Foreign Communication From a Counterpart Application, European Application No. 14904470.3, Extended European Search Report dated May 30, 2017, 9 pages.
Foreign Communication From a Counterpart Application, PCT Application No. PCT/CN2014/089196, English Translation of International Search Report dated Jul. 10, 2015, 2 pages.
Foreign Communication From a Counterpart Application, PCT Application No. PCT/CN2014/089196, English Translation of Written Opinion dated Jul. 10, 2015, 6 pages.
Machine Translation and Abstract of Korean Publication No. KR101226607, Feb. 5, 2013, 19 pages.
Foreign Communication From a Counterpart Application, Korean Application No. 10-2017-7010834, Korean Office Action dated Oct. 19, 2017, 8 pages.
Machine Translation and Abstract of Chinese Publication No. KR20130008123, Jan. 22, 2013, 42 pages.
Foreign Communication From a Counterpart Application, Korean Application No. 2018-059324255, Korean Notice of Second Final Rejection dated Aug. 31, 2018, 3 pages.
Foreign Communication From a Counterpart Application, Korean Application No. 2018-059324255, English Translatio of Korean Notice of Second Final Rejection dated Aug. 31, 2018, 2 pages.
Machine Translation and Abstract of Chinese Publication No. CN103971427, Aug. 6, 2014, 12 pages.
Machine Translation and Abstract of Chinese Publication No. CN103973442, Aug. 6, 2014, 14 pages.
Foreign Communication From a Counterpart Application, Chinese Application No. 201480034007.3, Chinese Office Action dated Dec. 10, 2018, 9 pages.

* cited by examiner

METHOD FOR TRANSMITTING VERIFICATION INFORMATION AND TERMINAL

CROSS-REFERENCE TO RELATED APPLICATIONS

This application is a national stage of International Application No. PCT/CN2014/089196, filed on Oct. 22, 2014, which is hereby incorporated by reference in its entirety.

TECHNICAL FIELD

The present disclosure relates to the field of communications technologies, and in particular, to a method for transmitting verification information and a terminal.

BACKGROUND

At present, when a user conducts activities such as online payment, enabling or registering with online banking, logging in to a WeChat application, validity of an identity of the user may be generally checked in the foregoing activities by choosing to use a short message service message verification code or a one-time-password for verification. Using online shopping and payment as an example, if the user shops by using a client (assuming that the client has permission to read a short message service message) in a mobile phone, and if the user chooses to authenticate the identity of the user in a short message service message verification manner after an order is generated, after a mobile phone short message service message sent by a third party server is received, the client may automatically read the short message service message from a short message service message inbox, extract a short message service message verification code, and enter the verification code into an authentication code input box, so as to complete authentication on the identity of the user and online payment.

If the user shops online by using a computer, in a short message service message verification manner, after the mobile phone receives a short message service message sent by the third party server, the user needs to open the short message service message inbox to view the short message service message, read a short message service message verification code, and then manually enter the short message service message verification code into a specified input box in a current payment web page of the computer. Alternatively, a mobile phone one-time-password function promoted by a payment application such as Alipay is another manner of authenticating an identity of a user. When using Alipay on a computer, the user needs to only log in to an Alipay client on the mobile phone and open mobile phone Baoling, a security authentication product developed by Alibaba, read a one-time-password generated in a current page of the Alipay, and then manually enter the one-time-password into an input box in a current payment web page of the computer.

However, in the foregoing process of reading the short message service message verification code from the short message service message of the mobile phone or reading the one-time-password, and then entering the verification information into the computer, relatively much user intervention is involved, operations are relatively complex, and the verification information needs to be memorized manually, easily resulting in occurrence of an error, relatively low efficiency, and poor user experience.

SUMMARY

Embodiments of the present disclosure disclose a method for transmitting verification information and a terminal, so that two terminals can transmit verification information automatically, so as to complete a verification operation, which reduces an input operation of a user, improves efficiency and accuracy of obtaining the verification information, and enhances an interaction capability of the terminals.

A first aspect of the embodiments of the present disclosure discloses a method for transmitting verification information, where the method may include: detecting, by a first terminal, whether a condition for performing a verification operation is satisfied; generating, by the first terminal, a verification information obtaining request if the condition for performing a verification operation is satisfied, where the verification information obtaining request is used to request a second terminal to feed back verification information; sending, by the first terminal, the verification information obtaining request to the second terminal; receiving, by the first terminal, a verification information obtaining response returned by the second terminal, where the verification information obtaining response includes the verification information; and sending, by the first terminal, the verification information to a server, where the verification information is used for the server to verify the first terminal.

With reference to the first aspect, in a first possible implementation manner of the first aspect, before the sending, by the first terminal, the verification information obtaining request to the second terminal, the method further includes: establishing, by the first terminal, a near field communication connection to the second terminal, where the verification information obtaining request and the verification information obtaining response are sent by using the near field communication connection.

With reference to the first aspect or the first possible implementation manner, in a second possible implementation manner of the first aspect, the condition for performing a verification operation includes: an application needing to obtain verification information is opened; or a current display interface of the first terminal is an interface related to the verification operation; or a trigger instruction entered by a user is received, where the trigger instruction is used to trigger the first terminal to perform the verification operation; or an application that needs to obtain verification information by calling a wireless function is opened, and the application has call permission.

With reference to the first aspect or the first or second possible implementation manner of the first aspect, in a third possible implementation manner of the first aspect, the verification information obtaining request includes auxiliary information, where the auxiliary information is used for the second terminal to determine a message including the verification information, or determine a validity time of the verification information.

With reference to the first aspect or the first, second or third possible implementation manner of the first aspect, in a fourth possible implementation manner of the first aspect, before the generating, by the first terminal, a verification information obtaining request, the method further includes: displaying, by the first terminal, a user interface including a verification window; and after the receiving, by the first terminal, a verification information obtaining response returned by the second terminal, the method further includes: extracting, by the first terminal, the verification information from the verification information obtaining response, and displaying the verification information in the verification window.

A second aspect of the embodiments of the present disclosure discloses a method for transmitting verification information, where the method may include: receiving, by a second terminal, a verification information obtaining request sent by a first terminal; obtaining, by the second terminal, verification information, and generating, by the second terminal, a verification information obtaining response, where the verification information obtaining response includes the verification information; and sending, by the second terminal to the first terminal, the verification information obtaining response, so that the first terminal sends the verification information to a server, where the verification information is used for the server to verify the first terminal.

With reference to the second aspect, in a first possible implementation manner of the second aspect, before the obtaining, by the second terminal, verification information, the method further includes: starting, by the second terminal, an application generating the verification information; or receiving, by the second terminal, a message that includes the verification information and that is sent by the server.

With reference to the second aspect or the first possible implementation manner of the second aspect, in a second possible implementation manner of the second aspect, before the receiving, by a second terminal, a verification information obtaining request sent by a first terminal, the method further includes: establishing, by the second terminal, a near field communication connection to the first terminal, where the verification information obtaining request and the verification information obtaining response are sent by using the near field communication connection.

With reference to the second aspect or the first or second possible implementation manner of the second aspect, in a third possible implementation manner of the second aspect, the obtaining, by the second terminal, verification information includes: obtaining the verification information according to a set extraction keyword, where the extraction keyword is set according to a type or a source of the verification information.

With reference to the second aspect or the first, second or third possible implementation manner of the second aspect, in a fourth possible implementation manner of the second aspect, the verification information obtaining request includes auxiliary information for determining a validity time of the verification information; and before the sending, by the second terminal to the first terminal, the verification information obtaining response, the method further includes: determining, by the second terminal according to the auxiliary information, that the obtained verification information is within the validity time.

A third aspect of the embodiments of the present disclosure discloses a terminal, where the terminal may include: a detection module, configured to detect whether a condition for performing a verification operation is satisfied; a generation module, configured to generate a verification information obtaining request when the detection module detects that the condition for performing a verification operation is satisfied, where the verification information obtaining request is used to request another terminal to feed back verification information; a first sending module, configured to send the verification information obtaining request to the another terminal; a receiving module, configured to receive a verification information obtaining response returned by the another terminal, where the verification information obtaining response includes the verification information; and a second sending module, configured to send the verification information to a server, where the verification information is used for the server to verify the first terminal.

With reference to the third aspect, in a first possible implementation manner of the third aspect, the terminal further includes an establishment module, configured to establish a near field communication connection to the another terminal before the first sending module sends the verification information obtaining request to the another terminal, where the verification information obtaining request and the verification information obtaining response are sent by using the near field communication connection.

With reference to the third aspect or the first possible implementation manner of the third aspect, in a second possible implementation manner of the third aspect, the condition for performing a verification operation includes: an application needing to obtain verification information is opened; or a current display interface is an interface related to the verification operation; or a trigger instruction entered by a user is received, where the trigger instruction is used to trigger the terminal to perform the verification operation; or an application that needs to obtain verification information by calling a wireless function is opened, and the application has call permission.

With reference to the third aspect or the first or second possible implementation manner of the third aspect, in a third possible implementation manner of the third aspect, the verification information obtaining request includes auxiliary information, where the auxiliary information is used for the another terminal to determine a message including the verification information, or determine a validity time of the verification information.

With reference to the third aspect or the first, second, or third possible implementation manner of the third aspect, in a fourth possible implementation manner of the third aspect, the terminal further includes: a display module, configured to: before the generation module generates the verification information obtaining request, display a user interface including a verification window; and an extraction module, configured to extract the verification information from the verification information obtaining response after the receiving module receives the verification information obtaining response returned by the another terminal, where the display module is further configured to display the verification information in the verification window. A fourth aspect of the embodiments of the present disclosure discloses a terminal, where the terminal may include: a terminal receiving module, configured to receive a verification information obtaining request sent by another terminal; an obtaining module, configured to obtain verification information; a generation module, configured to generate a verification information obtaining response, where the verification information obtaining response includes the verification information; and a sending module, configured to send, to the another terminal, the verification information obtaining response, so that the another terminal sends the verification information to a server, where the verification information is used for the server to verify the another terminal.

With reference to the fourth aspect, in a first possible implementation manner of the fourth aspect, the terminal further includes: a starting module, configured to: before the obtaining module obtains the verification information, start an application generating the verification information; and/or a server receiving module, configured to receive a message that includes the verification information and that is sent by the server.

With reference to the fourth aspect or the first possible implementation manner of the fourth aspect, in a second possible implementation manner of the fourth aspect, the terminal further includes: an establishment module, configured to establish a near field communication connection to the another terminal before the terminal receiving module receives the verification information obtaining request sent by the another terminal, where the verification information obtaining request and the verification information obtaining response are sent by using the near field communication connection.

With reference to the fourth aspect or the first or second possible implementation manner of the fourth aspect, in a third possible implementation manner of the fourth aspect, the obtaining module is configured to: obtain the verification information according to a set extraction keyword, where the extraction keyword is set according to a type or a source of the verification information.

With reference to the fourth aspect or the first, second or third possible implementation manner of the fourth aspect, in a fourth possible implementation manner of the fourth aspect, the verification information obtaining request includes auxiliary information for determining a validity time of the verification information; and the terminal further includes: a determining module, configured to: before the sending module sends, to the another terminal, the verification information obtaining response, determine, according to the auxiliary information, that the obtained verification information is within the validity time. A fifth aspect of the embodiments of the present disclosure discloses a terminal, where the terminal may include: a processor, configured to detect whether a condition for performing a verification operation is satisfied, where the processor is further configured to generate a verification information obtaining request if the condition for performing a verification operation is satisfied, where the verification information obtaining request is used to request another terminal to feed back verification information; and a transceiver, configured to send the verification information obtaining request to the another terminal, where the transceiver is further configured to receive a verification information obtaining response returned by the another terminal, where the verification information obtaining response includes the verification information; and the transceiver is further configured to send the verification information to a server, where the verification information is used for the server to verify the first terminal.

With reference to the fifth aspect, in a first possible implementation manner of the fifth aspect, before the transceiver sends the verification information obtaining request to the another terminal, the processor is further configured to: establish a near field communication connection to the second terminal, where the verification information obtaining request and the verification information obtaining response are sent by using the near field communication connection.

With reference to the fifth aspect or the first possible implementation manner of the fifth aspect, in a second possible implementation manner of the fifth aspect, the condition for performing a verification operation includes: an application needing to obtain verification information is opened; or a current display interface of the first terminal is an interface related to the verification operation; or a trigger instruction entered by a user is received, where the trigger instruction is used to trigger the first terminal to perform the verification operation; or an application that needs to obtain verification information by calling a wireless function is opened, and the application has call permission.

With reference to the fifth aspect or the first or second possible implementation manner of the fifth aspect, in a third possible implementation manner of the fifth aspect, the verification information obtaining request includes auxiliary information, where the auxiliary information is used for the second terminal to determine a message including the verification information, or determine a validity time of the verification information.

With reference to the fifth aspect or the first, second or third possible implementation manner of the fifth aspect, in a fourth possible implementation manner of the fifth aspect, the processor is further configured to: before generating the verification information obtaining request, display a user interface including a verification window; and after the transceiver receives the verification information obtaining response returned by the another terminal, the processor is further configured to extract the verification information from the verification information obtaining response, and display the verification information in the verification window.

A sixth aspect of the present disclosure discloses a terminal, where the terminal may include: a transceiver, configured to receive a verification information obtaining request sent by another terminal; and a processor, configured to obtain verification information, where the processor is further configured to generate a verification information obtaining response, where the verification information obtaining response includes the verification information; and the transceiver is configured to send, to the another terminal, the verification information obtaining response, so that the another terminal sends the verification information to a server, where the verification information is used for the server to verify the another terminal.

With reference to the sixth aspect, in a first possible implementation manner of the sixth aspect, before obtaining the verification information, the processor is further configured to: start an application generating the verification information; or receive a message that includes the verification information and that is sent by the server.

With reference to the sixth aspect or the first possible implementation manner of the sixth aspect, in a second possible implementation manner of the sixth aspect, before the transceiver receives the verification information obtaining request sent by the another terminal, the processor is further configured to: establish a near field communication connection to the another terminal, where the verification information obtaining request and the verification information obtaining response are sent by using the near field communication connection.

With reference to the sixth aspect or the first or second possible implementation manner of the sixth aspect, in a third possible implementation manner of the sixth aspect, a specific manner of obtaining the verification information by the processor is: obtain the verification information according to a set extraction keyword, where the extraction keyword is set according to a type or a source of the verification information.

With reference to the sixth aspect or the first, second or third possible implementation manner of the sixth aspect, in a fourth possible implementation manner of the sixth aspect, the verification information obtaining request includes auxiliary information for determining a validity time of the verification information; and before the transceiver sends the verification information obtaining response to the another terminal, the processor is further configured to: determine, according to the auxiliary information, that the obtained verification information is within the validity time.

A seventh aspect of the embodiments of the present disclosure discloses a computer storage medium, where the computer storage medium can store a program, and when the program is executed, some or all steps of any method in the method for transmitting verification information disclosed in the first aspect of the embodiments of the present disclosure are performed.

An eighth aspect of the embodiments of the present disclosure discloses a computer storage medium, where the computer storage medium can store a program, and when the program is executed, some or all steps of any method in the method for transmitting verification information disclosed in the second aspect of the embodiments of the present disclosure are performed.

In the embodiments of the present disclosure, when detecting that a condition for performing a verification operation is satisfied, a first terminal may generate a verification information obtaining request, to request a second terminal to feed back verification information. Then, the first terminal may automatically send the verification information obtaining request to the second terminal, and receive a verification information obtaining response returned by the second terminal, where the verification information obtaining response includes the verification information. The first terminal may send the verification information to a server, so that the server may verify the first terminal according to the verification information. In this way, an input operation of a user is reduced, efficiency and accuracy of obtaining verification information are improved, and an interaction capability of terminals is enhanced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a method for transmitting verification information and a terminal, so that two terminals can transmit verification information in a wireless transmission manner, so as to complete a verification process, which omits an operation of a user, and improves verification efficiency. A first terminal mentioned in the embodiments of the present disclosure includes a terminal such as a personal computer, a tablet computer, or a smart television that can perform a verification process or support performing a verification process by an application, and a second terminal may include a terminal such as a personal mobile phone or a tablet computer that can obtain verification information and support wireless communication with the first terminal. The foregoing method and terminals are separately described in detail below.

Figure 1:
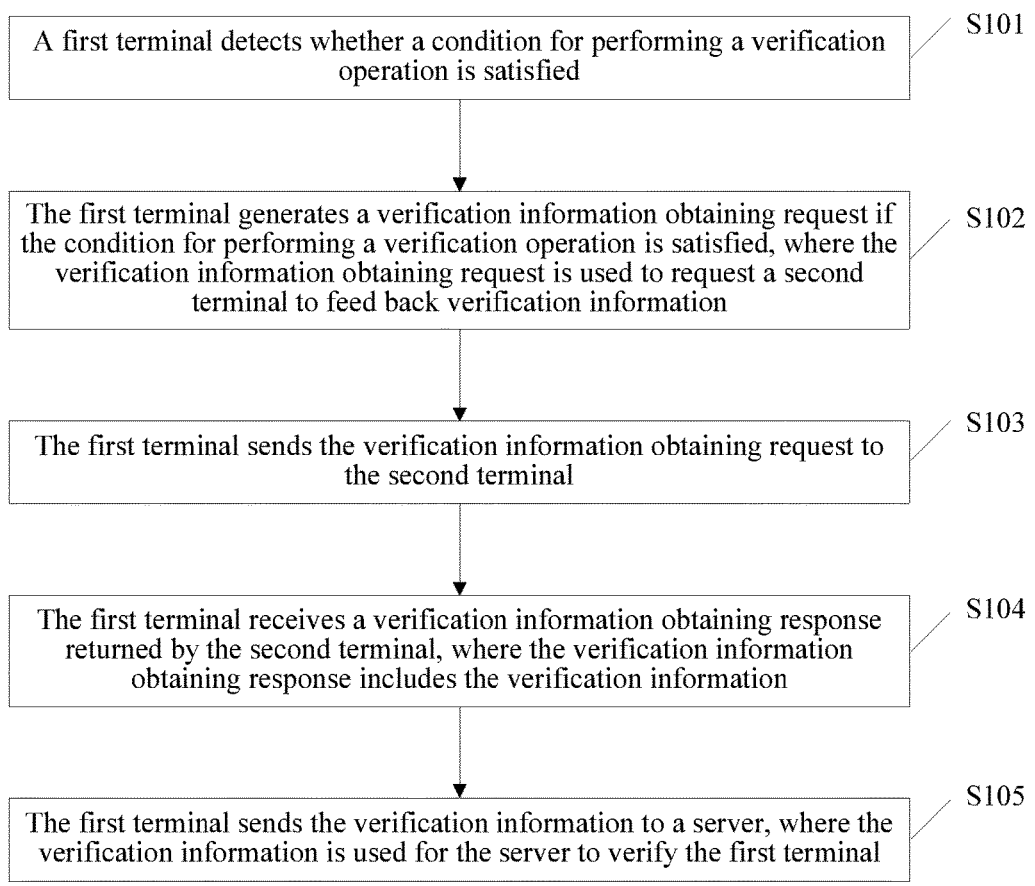
FIG. 1 is a flowchart of a method for transmitting verification information according to an embodiment of the present disclosure.

Refer to FIG. 1, which is a flowchart of a method for transmitting verification information according to an embodiment of the present disclosure. As shown in FIG. 1, the method may include the following steps.

Step S101: A first terminal detects whether a condition for performing a verification operation is satisfied.

Step S102: The first terminal generates a verification information obtaining request if the condition for performing a verification operation is satisfied, where the verification information obtaining request is used to request a second terminal to feed back verification information.

In an embodiment, the first terminal may generate the verification information obtaining request by detecting the condition for performing a verification operation. Optionally, the condition for needing to perform a verification operation that is detected by the first terminal may be specifically: an application needing to obtain verification information is opened; or a current display interface of the first terminal is an interface related to the verification operation; or a trigger instruction entered by a user is received, where the trigger instruction is used to trigger the first terminal to perform the verification operation; or an application that needs to obtain verification information by calling a wireless function is opened, and the application has call permission.

When the first terminal detects that an application that needs to obtain verification information by calling a wireless function is opened, the first terminal may be triggered to generate a verification information obtaining request, and the application may request the first terminal to obtain, in a wireless connection manner, verification information, where the wireless connection manner may be specifically a short-distance communications manner such as near field communication (NFC), Bluetooth, or Wireless Fidelity (WiFi), or may be another wireless long-distance communications manner. For example, a particular obtaining button such as "obtaining a verification code by means of NFC" or "obtaining a verification code by means of Bluetooth" may be set in the first terminal. When a user clicks the button, an application needing to obtain verification information is opened, to request to call an NFC function, a Bluetooth function, or the like of the terminal. For a wireless manner such as Bluetooth, a device list may pop up after the particular obtaining button is clicked, for the user to select a second terminal to obtain verification information. After the selection, a wireless connection can be established between the first and second terminal. For example, a wireless connection is established by means of near field communication. Optionally, the particular obtaining button may be "obtaining a verification code in a wireless manner". When a user clicks the button, a list of wireless connection manners (such as NFC or Bluetooth) may pop up for selection by the user. If the user selects one of the wireless connection manners, an application that needs to obtain verification information by calling a wireless function is triggered to be opened. Optionally, after detecting that the application is opened, the first terminal may further determine whether the application has call permission for calling the wireless function, and determine, if the application has the call permission for calling the wireless function, that a verification operation needs to be performed, and may further enable the corresponding wireless function if the terminal does not enable the corresponding wireless function in this case, to prepare to communicate with the second terminal; or may further determine, if the application does not have the call permission for calling the wireless function, whether it is the first time for the application to request to call the wireless function, and may further ignore the call request if it is the first time to request to call the wireless function, or may further query, if it is not the first time to request to call the wireless function, the user by using a prompt or in another manner whether to grant the call permission to the application; and once the user confirms that the wireless function can be called, the first terminal determines that a verification operation needs to be performed.

In this embodiment, when detecting that an application that needs to obtain verification information by calling a wireless function is opened, or after detecting that an application that needs to obtain verification information by calling a wireless function is opened and determining that the application that needs to obtain verification information has call permission for calling the wireless function, the first terminal may determine that a verification operation needs to be performed, so as to generate a verification information obtaining request.

In addition, the first terminal may also generate a verification information obtaining request by detecting another condition for performing a verification operation. For example, when the first terminal opens an application, for example, opens an application needing a verification operation, for example, logs in to a WeChat application in the first terminal for the first time, or opens a web client and registers an account in the first terminal, it may be determined that a verification operation needs to be performed on the first terminal; or when the first terminal detects that a current display interface is an interface related to a verification operation, if the current interface of the first terminal is a display interface of a shopping website, where if a user submits an order for payment after selecting a commodity, the current display interface may be a payment interface, it may be determined in this case that a verification operation needs to be performed on the first terminal; or according to a specific trigger instruction of a user, for example, clicking a "verification code obtaining" button by the user or entering, in multiple forms such as using a gesture, voice, or a fingerprint or taking a video by using a camera, a user trigger instruction used for obtaining a verification code into the first terminal, it may be determined, when the first terminal detects the user trigger instruction, that a verification operation needs to be performed on the first terminal.

Optionally, the first terminal may generate, according to different working modes of a wireless function, a verification information obtaining request corresponding to the working mode. For example, working modes of NFC may include a peer to peer (P2P) mode, a card reader mode, and the like. The working mode may be preset. The first terminal may generate, according to a different working mode of the NFC, a verification information obtaining request corresponding to the working mode.

Optionally, the first terminal may generate a verification information obtaining request including type indication information, where the type indication information is used to indicate a type of verification information. The second terminal may know, by using the type indication information, the type of the verification information required by the first terminal. Exemplarily, the type indication information may be represented by using one bit, where a bit of 0 represents a type of verification information, for example, a short message service message verification code; and a bit of 1 represents another type of verification information, for example, a one-time-password. Further exemplarily, each bit in a byte separately represents a type of verification information. For example, when the first bit is 1, it represents that verification information is a short message service message verification code, and when the second bit is 1, and it represents that verification information is a one-time-password.

In an optional embodiment, the generated verification information obtaining request may further include auxiliary information, where the auxiliary information is used for the second terminal to determine a message including the verification information, or determine a validity time of the verification information.

Exemplarily, for example, when a type of the verification information is a short message service message verification code, the auxiliary information may include an incoming message number of a short message service message sent by the server, so that the second terminal can find, from an inbox according to the incoming message number, a short message service message including the verification information more quickly and more accurately. For another example, when a type of the verification information is a one-time-password, the auxiliary information may include an instruction for refreshing the one-time-password, so that the second terminal can re-extract new verification information according to the refresh instruction. In conclusion, the auxiliary information may include multiple types of information, so as to help the second terminal perform multiple operations, for example, obtain or update the verification information.

In a preferred embodiment, before the first terminal sends the verification information obtaining request to the second terminal, the first terminal may establish a near field communication connection to the second terminal, where the verification information obtaining request and the verification information obtaining response are sent by using the near field communication connection. As described above, near field communication may include multiple manners such as NFC, Bluetooth, and Wi-Fi.

Step S103: The first terminal sends the verification information obtaining request to the second terminal.

In an embodiment, after the first terminal detects that the verification operation needs to be performed, and generates the verification information obtaining request, the first terminal may send the verification information obtaining request to the second terminal in a communications manner that is agreed on by the first terminal and the second terminal or in a called wireless connection manner. For example, the first terminal may send the verification information obtaining request to the second terminal by means of NFC, and for another wireless function such as Wi-Fi or Bluetooth, a similar method may be used. Optionally, the first terminal and the second terminal may preset a working mode of the wireless function. For example, when NFC communication is performed, it may be preset in such a manner that the first terminal sends the verification information obtaining request in P2P mode or card reader mode.

Step S104: The first terminal receives a verification information obtaining response returned by the second terminal, where the verification information obtaining response includes the verification information.

In an embodiment, after sending the verification information obtaining request to the second terminal, the first terminal may receive a verification information obtaining response fed back by the second terminal, where the verification information obtaining response includes the verification information required by the first terminal, so that the first terminal may obtain the required verification information.

Step S105: The first terminal sends the verification information to a server, where the verification information is used for the server to verify the first terminal.

In an embodiment, after obtaining the required verification information, the first terminal may send the verification information to the server, so that the server may verify the first terminal according to the verification information. For example, the verification information obtained by the first terminal is to verify an identity of the user of the first terminal. For example, the obtained verification information is information such as an identity card number or a bank card number. The information may be sent to the server, and be compared with user information stored in the server. If the information is the same as the user information stored in the server, it represents that verification on the first terminal succeeds; or if the information is different from the user information stored in the server, it represents that verification on the first terminal fails. For another example, the verification information obtained by the first terminal may also be information such as a one-time-password. The verification information may be sent to the server. Because the one-time-password is generated by the second terminal according to an application and is valid within a particular period of time, the server may detect, according to a synchronous time, whether the verification information is valid. If the verification information is valid, verification on the first terminal succeeds; or if the verification information is invalid, verification on the first terminal fails. The first terminal may also request, by re-sending a verification information obtaining request, to obtain verification information such as a one-time-password again.

In an optional embodiment, before generating the verification information obtaining request, the first terminal may display, in the current interface, a user interface including a verification window; and after receiving the verification information obtaining response returned by the second terminal, the first terminal may extract the verification information from the response, and display the verification information in the verification window. Optionally, the display mentioned in this embodiment of the present disclosure may be direct display, where if the verification information includes six digits, the six digits are directly displayed; or may be encrypted display, where if the verification information includes six digits, the digits may be displayed as other characters (such as "*"). It should be noted that this embodiment of the present disclosure is described by using only the wireless connection manner such as NFC or Bluetooth, but certainly, is not limited thereto. For example, the request or the response may also be transferred in another wireless or wired communications manner, or the like.

In this embodiment of the present disclosure, when detecting that a condition for performing a verification operation is satisfied, a first terminal may generate a verification information obtaining request, to request a second terminal to feed back verification information. Then, the first terminal may automatically send the verification information obtaining request to the second terminal, and receive a verification information obtaining response returned by the second terminal, where the verification information obtaining response includes the verification information. The first terminal may send the verification information to a server, so that the server may verify the first terminal according to the verification information. In this way, an input operation of a user is reduced, efficiency and accuracy of obtaining verification information are improved, and an interaction capability of terminals is enhanced.

Figure 2:
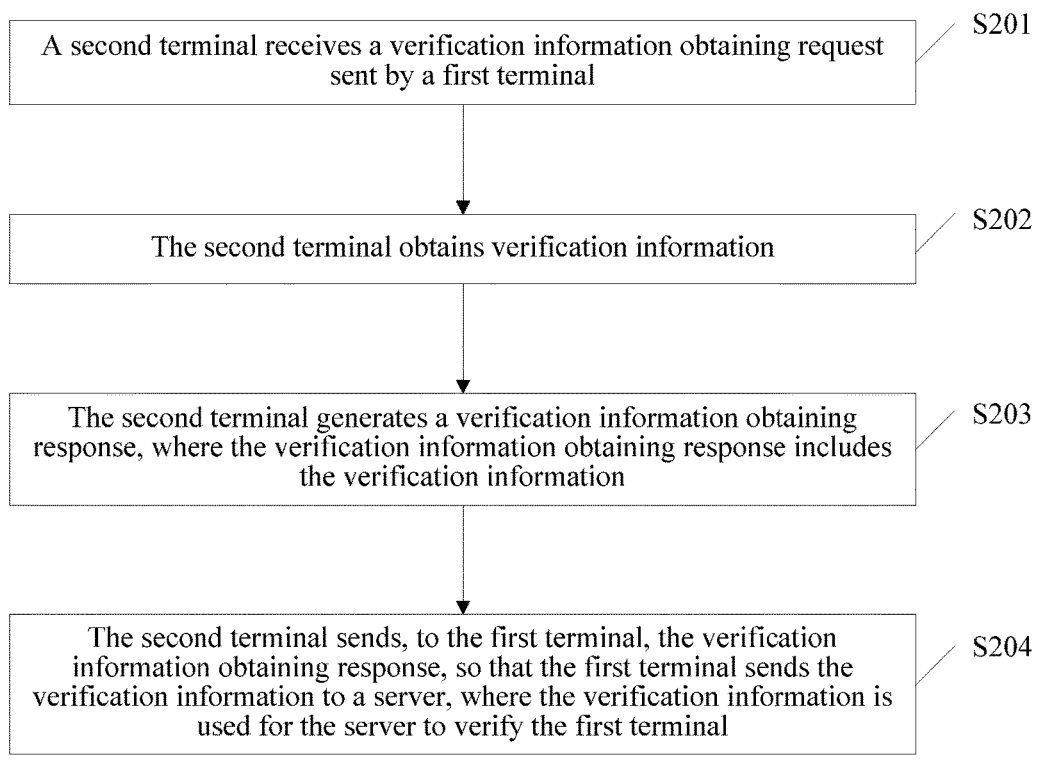
FIG. 2 is a flowchart of another method for transmitting verification information according to an embodiment of the present disclosure.

Refer to FIG. 2, which is a flowchart of another method for transmitting verification information according to an embodiment of the present disclosure. As shown in FIG. 2, the method may include the following steps.

Step S201: A second terminal receives a verification information obtaining request sent by a first terminal.

In an embodiment, the second terminal may receive, before obtaining verification information, the verification information obtaining request sent by the first terminal, or may receive, after obtaining verification information and/or generating a verification information obtaining response, the verification information obtaining request sent by the first terminal. If the verification information obtaining request is received before the verification information is obtained, the verification information may be obtained according to the request. In an optional embodiment, before the second terminal receives the verification information obtaining request sent by the first terminal, the first terminal may establish a near field communication connection to the second terminal, where the verification information obtaining request and the verification information obtaining response are sent by using the near field communication connection. As described above, near field communication may include multiple manners such as NFC, Bluetooth, and Wi-Fi.

Step S202: The second terminal obtains verification information.

In an embodiment, if the verification information obtaining request is not received before the verification information is obtained, the following steps may also be used to trigger the second terminal to obtain the verification information: starting, by the second terminal, an application generating the verification information; or receiving, by the second terminal, a message that includes the verification information and that is sent by the server.

When the second terminal starts the application generating the verification information, the second terminal may be triggered to obtain the verification information from the application, or when the second terminal receives a short message service message sent by the server, the second terminal may be triggered to obtain the verification information from the short message service message.

Optionally, if receiving a short message service message including the verification information, the second terminal may further determine whether read of an incoming message number of the short message service message is allowed, or whether the incoming message number is in a communication whitelist of the terminal. If the read of the incoming message number of the short message service message is allowed, or the incoming message number is in the communication whitelist of the terminal, the second terminal may extract the verification information from the short message service message of the incoming message number; or if the read of the incoming message number of the short message service message is not allowed, or the incoming message number is not in the communication whitelist of the terminal, the second terminal may ignore the short message service message of the incoming message number, and certainly, may also query a user by using a prompt or in another manner whether to add the incoming call number to the whitelist. Once the user determines to add the incoming call number to the whitelist, the verification information is extracted from the short message service message of the incoming message number.

In an optional embodiment, the obtaining, by the second terminal, verification information may include: obtaining the verification information according to a set extraction keyword, where the extraction keyword is set according to a type or a source of the verification information.

The second terminal may preset the extraction keyword, so as to obtain the verification information by using the extraction keyword according to a preset rule. The second terminal may set the extraction keyword according to the type or the source of the verification information.

Exemplarily, the verification information may be of multiple types such as a short message service message verification code, a one-time-password, an identity card number, or a bank card number, and the second terminal may set a different extraction keyword according to a different type of the verification information. For example, when the verification information is a short message service message verification code, the keyword may be set to a "verification code", a "check code", or the like, and a corresponding preset rule may be: extracting continuous n digits after the keyword as the verification information, or may be: extracting a combination of continuous digits and letters after the keyword as the verification information, or may be: extracting multiple segments of continuous digits and/or letters after the keyword, and then splicing the multiple segments of continuous digits and/or letters as the verification information. For another example, when the verification information is a bank card number, the keyword may be set to a "card number", an "account", a "credit card", or the like, and a corresponding preset rule may be: extracting continuous m digits after the keyword as the verification information, or may be: extracting a combination of continuous digits and letters after the keyword as the verification information, or may be: extracting multiple segments of continuous digits and/or letters after the keyword, and then splicing the multiple segments of continuous digits and/or letters as the verification information. Certainly, the present disclosure is not limited thereto.

Exemplarily, the verification information may also be a short message service message verification code sent from a different incoming message number, a one-time-password dynamically generated by an application (an application such as mobile phone Baoling that can generate a one-time-password), or the like, and the second terminal may set a different extraction keyword according to a different source of the verification information. For example, if the incoming message number is a number of a bank A, the keyword is set to a keyword A such as a dynamic password, and a corresponding preset rule A is: extracting six continuous digits after the keyword as the verification information. For another example, if the incoming message number is a number of a bank B, the keyword is set to a keyword B such as a verification code, and a corresponding preset rule B: extracting multiple segments of continuous digits and/or letters after the keyword, and then splicing the multiple segments of continuous digits and/or letters as the verification information. In this way, when receiving a short message service message verification code sent by an incoming message number or a verification information obtaining request of auxiliary information: an incoming message number, the second terminal may pertinently and quickly extract the verification code from a short message service message according to the incoming message number, and a corresponding keyword and a preset rule that are of the incoming message number, which can improve efficiency of extracting verification information to a certain extent.

It should be noted that the present disclosure is not limited to the foregoing setting method, and the second terminal may also set unified extraction keywords for verification information of all types or from all sources. For example, a keyword database is created to store keywords such as a dynamic password, a one-time-password, a dynamic verification code, a dynamic key, and a verification code, and when detecting a keyword stored in the keyword database, the second terminal may obtain verification information according to a preset rule, for example, extract digits or letters after the keyword or a combination of the digits or the letters after the keyword.

Step S203: The second terminal generates a verification information obtaining response, where the verification information obtaining response includes the verification information.

In an embodiment, after extracting the verification information, the second terminal may generate the verification information obtaining response including the verification information. Optionally, the second terminal may generate a verification information obtaining response including a different piece of type indication information, so that the first terminal parses out corresponding verification information after receiving the verification information obtaining response and completes a corresponding verification operation. Optionally, the second terminal may generate a corresponding verification information obtaining response according to a preset communications manner or even a working mode (such as a P2P working mode or a card emulation (CE) working mode (that is, used as an NFC tag) of NFC communication) of a communications manner, so that the first terminal can receive the verification information obtaining response in a corresponding working mode.

In an embodiment, the second terminal may receive, after generating the verification information obtaining response, the verification information obtaining request sent by the first terminal, or may receive the verification information obtaining request before obtaining the verification information and/or generating the verification information obtaining response.

In an optional embodiment, if the verification information obtaining request received by the second terminal includes auxiliary information for determining a validity time of the verification information, the second terminal determines, according to the auxiliary information, that the obtained verification information is within the validity time.

The auxiliary information may include the validity time of the verification information, and the second terminal may determine, according to the auxiliary information, whether the verification information is invalid. For example, after receiving a short message service message including verification information, the second terminal determines whether a difference between a time of receiving a verification information obtaining request by the second terminal and a time of starting extraction of a verification code in the short message service message is greater than a validity time (such as one minute) of the verification information, and if the difference is greater than the validity time, determines that the extracted verification information already is invalid, and the second terminal needs to re-obtain verification information according to step S201 to step S203, and generate a new verification information obtaining response; otherwise, the second terminal determines that the verification information is valid, and may directly feed back the verification information to the first terminal.

In addition, the second terminal may determine, according to the validity time of the verification information, whether the verification information is already invalid. For example, after a user opens mobile phone Baoling of an Alipay client of a mobile phone, the second terminal determines whether a difference between a time of receiving a verification information obtaining request by the second terminal and a time of starting extraction of a one-time-password is greater than or equal to a validity time (such as 30 seconds) of the verification information, and if the difference is greater than or equal to the validity time, determines that the obtained verification information is already invalid, and the second terminal needs to re-obtain verification information according to step S201 to step S203, and generate a new verification information obtaining response; otherwise, the second terminal determines that the verification information is valid, and may directly feed back the verification information to the first terminal.

Step S204: The second terminal sends, to the first terminal, the verification information obtaining response, so that the first terminal sends the verification information to a server, where the verification information is used for the server to verify the first terminal.

In an embodiment, the second terminal may send the generated verification information obtaining response to the first terminal, so that the first terminal may extract the verification information from the verification information obtaining response. The first terminal may send the verification information to the server, for verification on the first terminal. In this way, an entire verification process is completed.

In this embodiment of the present disclosure, a second terminal receives a verification information obtaining request sent by a first terminal, obtains verification information, and then may generate a verification information obtaining response including the verification information, and send the response to the first terminal, so that the first terminal sends the verification information to a server, where the verification information is used for the server to verify the first terminal. In this way, an input operation of a user is reduced, efficiency and accuracy of obtaining verification information are improved, and an interaction capability of terminals is enhanced.

Figure 3:
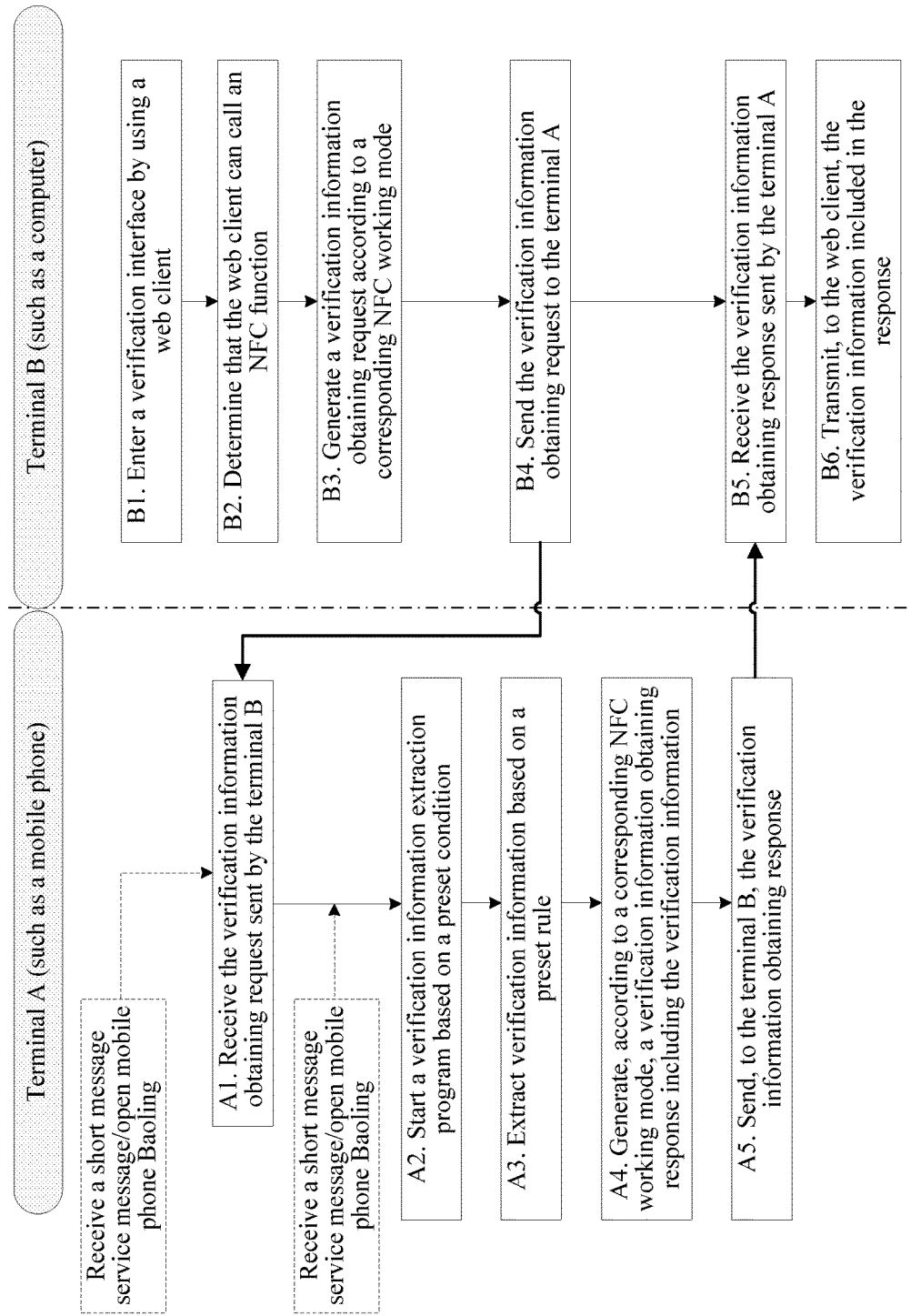
FIG. 3 is a flowchart of a structure of a system for transmitting verification information according to an embodiment of the present disclosure.
Figure 4:
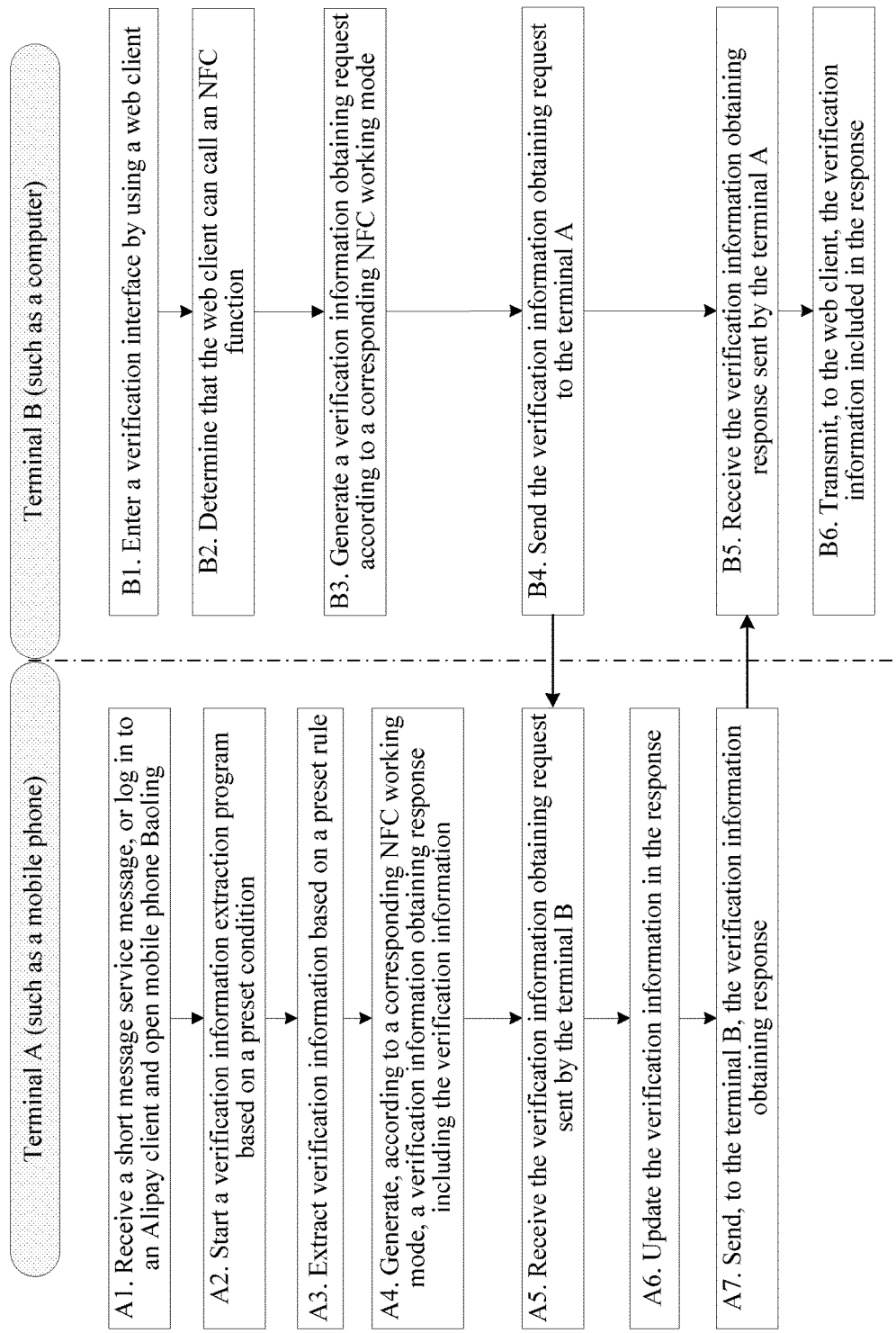
FIG. 4 is a flowchart of a structure of anther system for transmitting verification information according to an embodiment of the present disclosure.

A process of transmitting verification information between a terminal A and a terminal B is described by using examples in FIG. 3 and FIG. 4. For the terminal B, reference may be made to the first terminal in the foregoing embodiment, which, is specifically, for example, a computer having an NFC function. For a specific structure of the terminal B, reference may be made to FIG. 5 and FIG. 7. For the terminal A, reference may be made to the second terminal in the foregoing embodiment, which, is specifically, for example, a mobile phone having an NFC function. For a specific structure of the terminal A, reference may be made to FIG. 6 and FIG. 8. In addition, in embodiments described in FIG. 3 and FIG. 4, the terminal A and the terminal B both perform NFC communication in P2P working mode. Certainly, the present disclosure is not limited thereto.

Referring to FIG. 3 and FIG. 4, in the embodiments of the present disclosure, the terminal B may perform, as a terminal needing to obtain verification information, the following steps.

B1: The terminal B enters a verification interface by using a web client.

B2: The terminal B may determine, according to a condition, that the web client can call an NFC function.

It should be noted that the foregoing condition may be any one of the following:

(1): The terminal B receives an NFC function call request sent by the web client.

For example, a user clicks a "verification code obtaining" button in a page of a payment browser, to trigger the web client to send, to the terminal B, the NFC function call request.

For another example, a button of "obtaining a verification code by means of NFC" is added to a page of a payment browser, or an "NFC obtaining manner" option is added to a "verification code obtaining" button, and a user selects to obtain a verification code by means of NFC, to trigger the web client to send, to the terminal B, the NFC function call request.

(2): The terminal B detects an event actively.

For example, the terminal B detects an operation on the web client, and may trigger, after the browser jumps to a payment page, the web client to call the NFC function.

For another example, when detecting that a verification information obtaining event such as clicking the "verification code obtaining" button occurs in the browser, the terminal B may trigger the web client to call the NFC function.

B3: Generate a verification information obtaining request according to a corresponding NFC working mode.

It should be noted that for two cases: a short message service message verification code and mobile phone Baoling, the terminal B may generate different requests, or may generate requests including different pieces of type indication information. For example, the request includes 1-byte type indication bits b8, . . . , b1, where when b1 is 1, it represents obtaining a short message service message verification code, when b2 is 1, it represents obtaining a one-time-password of mobile phone Baoling, and so on; or the request includes 1-byte type indication information, where when a value of the byte is 0×01, it represents obtaining a short message service message verification code, when the value of the byte is 0×02, it represents obtaining a one-time-password of the mobile phone Baoling, and so on.

In addition, the verification information obtaining request may further carry auxiliary information, for example, may carry an incoming message number for a request for obtaining a short message service message verification code, to help the terminal A quickly locate a short message service message and rapidly extract a verification code, or may carry a time of a server and/or an instruction for refreshing a one-time-password for a request for obtaining a one-time-password of mobile phone Baoling, to help the terminal A synchronize a time of a mobile phone and a time of the server, and to ensure that one-time-passwords generated at two ends: the terminal A and the server are consistent, and/or to generate a new one-time-password.

It should be noted that in this embodiment, the terminal B may generate the request in P2P mode or card reader (Reader) mode. Selection of the NFC working mode may be preset in an implementation. In addition, the request may be generated before the terminal A and the terminal B get close, or after the terminal A and the terminal B get close.

B4: Send the verification information obtaining request to the terminal A by means of NFC.

B5: Receive a verification information obtaining response fed back by the terminal A, where the verification information obtaining response includes verification information.

B6: Transmit, to the web client, the verification information in the response, so as to enter the verification information into a corresponding input box in the verification interface.

Referring to FIG. 3, in this embodiment of the present disclosure, after receiving the verification information obtaining request sent by the terminal B, the terminal A starts a verification information extraction program, extracts the verification information, generates the verification information obtaining response, and the like. Specific implementation steps are as follows:

A1: Receive the verification information obtaining request sent by the terminal B.

It should be noted that a step of receiving a short message service message or opening mobile phone Baoling may be performed before or after step A1, that is, the short message service message may be received before step A1 or the mobile phone Baoling may be opened before step A1, or the short message service message may be received after step A1 or the mobile phone Baoling may be opened after step A1.

A2: Start, based on a preset condition, a verification information extraction program.

It should be noted that the preset condition may be any one of the following:

(1): Verification information obtaining request

After receiving the obtaining request, the terminal A may determine, according to a type of the request or type indication information in the request, whether the terminal B requests to obtain verification information such as a short message service message verification code or a one-time-password, and starts the verification information extraction program in time if the terminal B requests to obtain verification information, so as to extract the required verification information from a short message service message inbox, mobile phone Baoling, or another place from which the verification information is stored or generated. (2): Verification information obtaining request and a short message service message/mobile phone Baoling After receiving the obtaining request, the terminal A may determine whether a short message service message is received or whether mobile phone Baoling is opened/refreshed within a particular period of time T before or after the request is received, to determine whether to start the verification information extraction program, and start the extraction program in time if the short message service message is received or the mobile phone Baoling is opened/refreshed within the particular period of time T before or after the request is received, so as to extract required verification information from a short message service message inbox, mobile phone Baoling, or another place from which the verification information is stored or generated.

In addition, according to the foregoing step B2, assuming that the obtaining request is a request for obtaining verification information in a short message service message, and includes an incoming message number N, the terminal A may determine whether a short message service message from the incoming message number N is received within a period of time T before or after the request is received, and start the verification information extraction program if the short message service message from the incoming message number N is received within the period of time T; otherwise, does not start the verification information extraction program.

It should be noted that the verification information extraction program may also be always running, that is, be started before step A1. After receiving the verification information obtaining request in step A1, the terminal A directly extracts the verification information from a short message service message or mobile phone Baoling according to the request and based on the preset rule.

A3: Extract the verification information based on a preset rule.

It should be noted that the preset rule may be specifically divided for different cases:

(1): For a case of obtaining a short message service message verification code

Different extraction keywords may be set for different incoming message numbers, so that the terminal A screens out a valid verification code in a last received short message service message pertinently and accurately. For example, when a credit card of Industrial and Commercial Bank of China is used for quick pay, a short message service message sent from 955xx is received, and has content such as "A serial number is 123456 and a dynamic password is 987654. Your card with a tail number of 0000 is paying for online shopping, with an order merchant: xxx, and an amount: xx.x renminbi (RMB). Do not disclose the dynamic password. [xx bank]". In this way, a preset rule set for Industrial and Commercial Bank of China is: extracting six digits after a keyword "dynamic password" from the short message service message having an incoming message number of 95588.

Unified extraction keywords may also be set, so that the terminal A screens out all short message service messages including these keywords, and extracts a verification code from a last received short message service message. For example, a preset rule set for all incoming short message service messages is: extracting six characters such as "digits and letters" or "digits" after a keyword such as a "dynamic password", a "dynamic verification code", a "one-time-password", a "dynamic key", or a "verification code".

In the foregoing two manners, a time limit TO may be further added to the preset rule, so that the terminal A screens out and extracts a short message service message that is within TO before a current time.

(2): For a case of obtaining a one-time-password case of mobile phone Baoling.

The preset rule may be set to: extracting all digits displayed on a current page of the mobile phone Baoling.

A4: Generate, according to a corresponding NFC working mode, a verification information obtaining response including the verification information.

It should be noted that the NFC working mode may be P2P or CE, and may be preset in an implementation.

A5: Send, to the terminal B, the verification information obtaining response.

Referring to FIG. 4, in this embodiment of the present disclosure, for steps performed by the terminal B, reference may be made to the steps shown in FIG. 3, and details are not described herein again. Before getting close to the terminal B, the terminal A performs steps of starting a verification information extraction program, extracting verification information, and even generating a response in advance, and details are as follows:

A1: Receive a short message service message, or log in to an Alipay client and open mobile phone Baoling.

A2: Start a verification information extraction program based on a preset condition.

It should be noted that the preset condition may be: receiving a short message service message/opening mobile phone Baoling.

The terminal A determines, according to whether a short message service message is received or whether mobile phone Baoling is opened/refreshed, whether to start the verification information extraction program, and starts the extraction program in time if the short message service message is received or the mobile phone Baoling is opened/refreshed, so as to extract required verification information from a short message service message inbox, mobile phone Baoling, or another place from which the verification information is stored or generated.

In addition, assuming that the terminal A receives a short message service message, the extraction program may be directly started; or it may be determined according to an incoming message number whether the incoming message number is already marked in a whitelist, and the verification information extraction program is opened if the incoming message number is already marked as one of the whitelist; otherwise, the verification information extraction program is not started.

It should be noted that the verification information extraction program may also be always running, that is, be started before step A1. After determining that a short message service message is received or mobile phone Baoling is currently opened, the terminal A directly extracts the verification information from the short message service message or the mobile phone Baoling based on the preset rule.

A3: Extract verification information based on a preset rule.

It should be noted that for the preset rule, reference may be specifically made to specific content that is described in step A3 in FIG. 3 above, and details are not described herein again.

A4: Generate, based on a corresponding NFC working mode, a verification information obtaining response including the verification information in advance.

It should be noted that the verification information obtaining response may be generated in advance as described in this step, or may be generated after the verification information obtaining request described in step A5 is received, that is, may be generated after the following step A5 or optional step A6.

In addition, to avoid that after the response is generated and before the obtaining request is received, the terminal A receives a short message service message verification code again, or a one-time-password is updated, step A6, which is an operation step for updating the verification information in the response, may be added between the following step A5 and step A7. For example, mobile phone Baoling is currently updated every 30 seconds; and if an updating countdown is 2 s when a response is generated, and the terminals A and B get close after 2 s, a one-time-password in the response that has been generated previously is already invalid. Therefore, the one-time-password in the response needs to be updated.

A5: Receive, by means of NFC, the verification information obtaining request sent by the terminal B.

A6: Update the verification information in the foregoing verification information obtaining response.

A7: Send, to the terminal B, the verification information obtaining response.

In an optional embodiment, in addition to that the two terminals both work in P2P mode in the descriptions in FIG. 3 and FIG. 4, the two terminals may also perform read and write operations, that is, the terminal A works in CE mode and emulates an NFC tag including the verification information, and the terminal B may work in card reader mode to read the verification information in the NFC tag; or the terminal B works in CE mode and emulates an NFC tag, and the terminal A may work in card reader mode to generate a write command including the verification information, so as to write the verification information to the terminal B.

In this embodiment of the present disclosure, when detecting that a verification operation needs to be performed, a terminal B may generate a verification information obtaining request, to request a terminal A to feed back verification information. Then, the terminal B may send the verification information obtaining request to the terminal A in a communications manner such as NFC, and receive a verification information obtaining response returned by the terminal A, where the verification information obtaining response includes the verification information. The terminal A extracts the verification information after detecting a preset condition for extracting the verification information, then generates the verification information obtaining response including the verification information, and sends, to the terminal B, the response. The terminal B may send the verification information to a server, and the server verifies the terminal B according to the verification information, so as to complete a verification operation. In this way, an input operation of a user is reduced, efficiency and accuracy of obtaining verification information are improved, and an interaction capability of terminals is enhanced.

Figure 5:
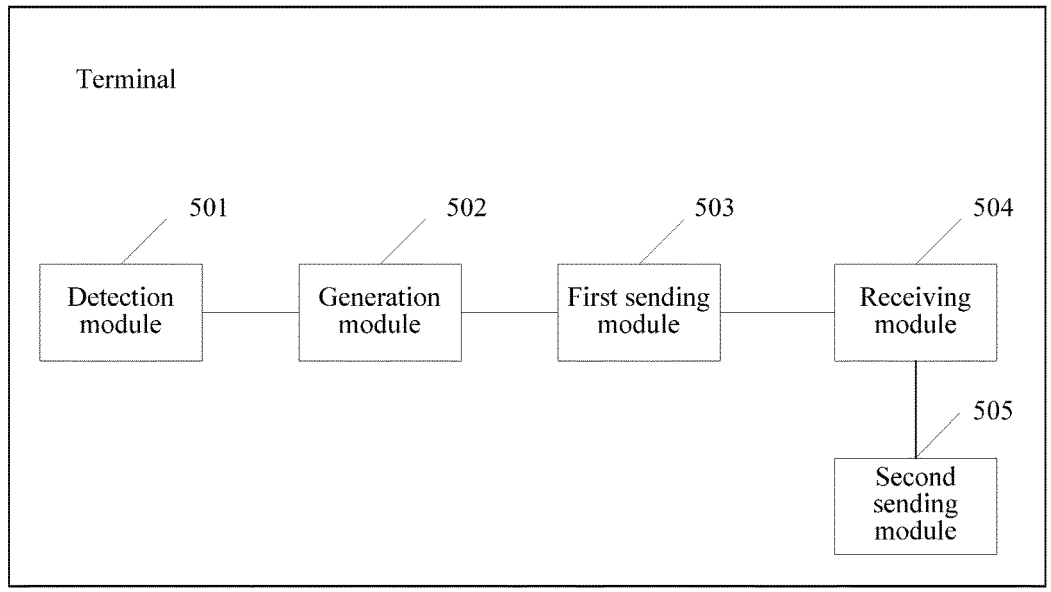
FIG. 5 is a structural diagram of a terminal according to an embodiment of the present disclosure.

Refer to FIG. 5, which is a structural diagram of a terminal according to an embodiment of the present disclosure. As shown in FIG. 5, the terminal may include a detection module 501, a generation module 502, a first sending module 503, a receiving module 504, a second sending module 505.

The detection module 501 is configured to detect whether a condition for performing a verification operation is satisfied.

The generation module 502 is configured to generate a verification information obtaining request when the detection module 501 detects that the condition for performing a verification operation is satisfied, where the verification information obtaining request is used to request another terminal to feed back verification information.

In an embodiment, the terminal may detect, by using the detection module 501, the condition for performing a verification operation, and generate the verification information obtaining request by using the generation module 502. Optionally, the condition for needing to perform a verification operation that is detected by the detection module 501 may be: an application needing to obtain verification information is opened; or a current display interface of the terminal is an interface related to the verification operation; or a trigger instruction entered by a user is received, where the trigger instruction is used to trigger the terminal to perform the verification operation; or an application that needs to obtain verification information by calling a wireless function is opened, and the application has call permission.

When the detection module 501 detects that an application that needs to obtain verification information by calling a wireless function is opened, the generation module 502 may be triggered to generate a verification information obtaining request, and the application may request the terminal to obtain verification information in a wireless connection manner, where the wireless connection manner may be a communications manner such as NFC, Bluetooth, or WiFi. For example, a particular obtaining button such as "obtaining a verification code by means of NFC" or "obtaining a verification code by means of Bluetooth" may be set in the terminal. When a user clicks the button, an application needing to obtain verification information is opened, to request to call an NFC function, a Bluetooth function, or the like of the terminal. For a wireless manner such as Bluetooth, a device list may pop up after the particular obtaining button is clicked, for the user to select another terminal to obtain verification information. After the selection, a wireless connection can be established between the terminal and the another terminal. For example, a wireless connection is established by means of near field communication. Optionally, the particular obtaining button may be "obtaining a verification code in a wireless manner". When a user clicks the button, a list of wireless connection manners (such as NFC or Bluetooth) may pop up for selection by the user. If the user selects one of the wireless connection manners, an application that needs to obtain verification information by calling a wireless function is triggered to be started.

Optionally, after detecting that the application is opened, the first terminal may further determine whether the application has call permission for calling the wireless function, and determine, if the application has the call permission for calling the wireless function, that a verification operation needs to be performed, and may further enable the corresponding wireless function if the terminal does not enable the corresponding wireless function in this case, to prepare to communicate with the second terminal; or may further determine, if the application does not have the call permission for calling the wireless function, whether it is the first time for the application to request to call the wireless function, and further ignores the call request if it is the first time to request to call the wireless function, or may further query, if it is not the first time to request to call the wireless function, the user by using a prompt or in another manner whether to grant the call permission to the application; once the user confirms that the wireless function can be called, the terminal determines that a verification operation needs to be performed.

In this embodiment, when the detection module 501 detects that an application that needs to obtain verification information by calling a wireless function is opened, or after the detection module 501 detects that an application that needs to obtain verification information by calling a wireless function is opened and determines that the application that needs to obtain verification information has call permission for calling the wireless function, it may be determined that a verification operation needs to be performed, so as to generate a verification information obtaining request.

In addition, the detection module 501 may also generate a verification information obtaining request by detecting another condition for performing a verification operation. For example, when the terminal opens an application, for example, opens an application needing a verification operation, for example, logs in to a WeChat application in the terminal for the first time, or opens a web client and registers an account in the terminal, it may be determined that a verification operation needs to be performed on the terminal; or when the detection module 501 detects that a current display interface is an interface related to a verification operation, if the current interface of the terminal is a display interface of a shopping website, where if a user submits an order for payment after selecting a commodity, the current display interface may be a payment interface, it may be determined in this case that a verification operation needs to be performed on the first terminal; or according to a specific trigger instruction of a user, for example, clicking a "verification code obtaining" button by the user or entering, in multiple forms such as using a gesture, voice, or a fingerprint or taking a video by using a camera, a user trigger instruction used for obtaining a verification code into the terminal, it may be determined, when the detection module 501 detects the user trigger instruction, that a verification operation needs to be performed on the terminal.

Optionally, the terminal may generate, according to different working modes of a wireless function, a verification information obtaining request corresponding to the working mode. For example, working modes of NFC may include a P2P mode, a card reader mode, and the like. The working mode may be preset. The terminal may generate, according to a different working mode of the NFC, a verification information obtaining request corresponding to the working mode.

Optionally, the generation module 502 may generate a verification information obtaining request including type indication information, where the type indication information is used to indicate a type of verification information. The another terminal may know, by using the type indication information, the type of the verification information required by the terminal. Exemplarily, the type indication information may be represented by using one bit, where a bit of 0 represents a type of verification information, for example, a short message service message verification code; and a bit of 1 represents another type of verification information, for example, a one-time-password. Further exemplarily, each bit in a byte separately represents a type of verification information. For example, when the first bit is 1, it represents that verification information is a short message service message verification code, and when the second bit is 1, and it represents that verification information is a one-time-password.

In an optional embodiment, the generated verification information obtaining request may further include auxiliary information, where the auxiliary information is used for the second terminal to determine a message including the verification information, or determine a validity time of the verification information.

For example, when a type of the verification information is a short message service message verification code, the auxiliary information may include an incoming message number of a short message service message sent by the server, so that the another terminal can find, from an inbox according to the incoming message number, a short message service message including the verification information more quickly and more accurately. For another example, when a type of the verification information is a one-time-password, the auxiliary information may include an instruction for refreshing the one-time-password, so that the another terminal can re-extract new verification information according to the refresh instruction. In conclusion, the auxiliary information may include multiple types of information, so as to help the another terminal perform multiple operations, for example, obtain or update the verification information.

In a preferred embodiment, the terminal may further include: an establishment module, configured to establish a near field communication connection to the second terminal before the first sending module 503 sends the verification information obtaining request to the second terminal, where the verification information obtaining request and the verification information obtaining response are sent by using the near field communication connection. As described above, near field communication may include multiple manners such as NFC, Bluetooth, and Wi-Fi.

The first sending module 503 is configured to send the verification information obtaining request to the another terminal.

In an embodiment, after the terminal detects by using the detection module 501 that the verification operation needs to be performed, and generates the verification information obtaining request by using the generation module 502, the first sending module 503 may send the verification information obtaining request to the another terminal by using a communications manner that is agreed on by the terminal and the another terminal or in a called wireless connection manner. For example, the terminal may send the verification information obtaining request to the another terminal by means of NFC, and for another wireless function such as Wi-Fi or Bluetooth, a similar method is used. Optionally, the terminal and the another terminal may preset a working mode of the wireless function. For example, when NFC communication is performed, it may be preset in such a manner that the terminal sends the verification information obtaining request in P2P mode or card reader mode.

The receiving module 504 is configured to receive a verification information obtaining response returned by the another terminal, where the verification information obtaining response includes the verification information.

In an embodiment, after sending the verification information obtaining request to the another terminal by using the sending module 503, the terminal may receive, by using the receiving module 504, a verification information obtaining response fed back by the another terminal, where the verification information obtaining response includes the verification information required by the terminal, so that the terminal may obtain the required verification information.

The second sending module 505 is configured to send the verification information to a server, where the verification information is used for the server to verify the terminal.

In an embodiment, after the terminal obtains the required verification information, the second sending module 505 may send the verification information to the server, so that the server may verify the terminal according to the verification information. For example, the verification information obtained by the terminal is to verify an identity of the user of the terminal. For example, the obtained verification information is information such as an identity card number or a bank card number. The information may be sent to the server, and be compared with user information stored in the server. If the information is the same as the user information stored in the server, it represents that verification on the terminal succeeds; or if the information is different from the user information stored in the server, it represents that verification on the terminal fails. For another example, the verification information obtained by the terminal may also be information such as a one-time-password. The verification information may be sent to the server. Because the one-time-password is generated by the another terminal according to an application and is valid within a particular period of time, the server may detect, according to a synchronous time, whether the verification information is valid. If the verification information is valid, verification on the terminal succeeds; or if the verification information is invalid, verification on the terminal fails. The terminal may also request, by re-sending a verification information obtaining request, to obtain verification information such as a one-time-password again.

In an optional embodiment, the terminal may further include a display module and an extraction module. The display module is configured to: before the generation module 502 generates the verification information obtaining request, display, in the current interface, a user interface including a verification window. The extraction module is configured to extract the verification information from the response after the receiving module 504 receives the verification information obtaining response returned by the another terminal. In this case, the display module displays the verification information in the verification window. Optionally, the display mentioned in this embodiment of the present disclosure may be direct display, where if the verification information includes six digits, the six digits are directly displayed; or may be encrypted display, where if the verification information includes six digits, the digits may be displayed as other characters (such as "*"). It should be noted that this embodiment of the present disclosure is described by using only the wireless connection manner such as NFC or Bluetooth, but certainly, is not limited thereto. For example, the request or the response may also be transferred in another wireless or wired communications manner, or the like.

In this embodiment of the present disclosure, when detecting that a condition for performing a verification operation is satisfied, the terminal may generate a verification information obtaining request, to request the another terminal to feed back verification information. Then, the terminal may automatically send the verification information obtaining request to the another terminal, and receive a verification information obtaining response returned by the another terminal, where the verification information obtaining response includes the verification information. The terminal may send the verification information to the server, so that the server may verify the terminal according to the verification information. In this way, an input operation of a user is reduced, efficiency and accuracy of obtaining verification information are improved, and an interaction capability of terminals is enhanced.

Figure 6:
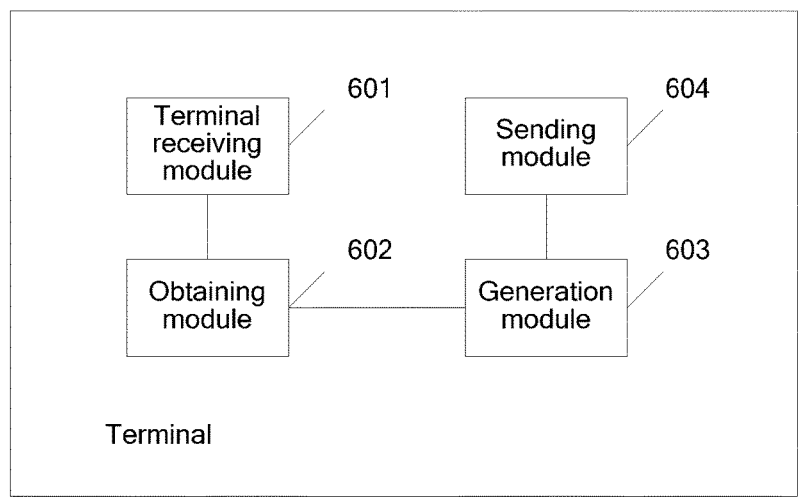
FIG. 6 is a structural diagram of another terminal according to an embodiment of the present disclosure.

Refer to FIG. 6, which is a structural diagram of a terminal according to an embodiment of the present disclosure. According to the terminal shown in FIG. 6, the terminal may include a terminal receiving module 601, an obtaining module 602, a generation module 603, and a sending module 604.

The terminal receiving module 601 is configured to receive a verification information obtaining request sent by another terminal.

In an embodiment, the terminal receiving module 601 may receive, before verification information is obtained, the verification information obtaining request sent by the another terminal, or may receive, after verification information is obtained and/or a verification information obtaining response is generated, the verification information obtaining request sent by the another terminal. If the verification information obtaining request is received before the verification information is obtained, the verification information may be obtained according to the request.

In an optional embodiment, the terminal may further include: an establishment module, configured to establish a near field communication connection to the second terminal before the terminal receiving module 601 receives the verification information obtaining request sent by the first terminal, where the verification information obtaining request and the verification information obtaining response are sent by using the near field communication connection.

As described above, near field communication may include multiple manners such as NFC, Bluetooth, and Wi-Fi.

The obtaining module 602 is configured to obtain verification information.

In an embodiment, the terminal may further include a starting module and/or a server receiving module. If the terminal does not receive the verification information obtaining request before the verification information is obtained, the terminal may also start, by using the starting module, an application generating the verification information; or receive, by using the server receiving module, a message that includes the verification information and that is sent by the server.

When the starting module starts the application generating the verification information, the terminal may be triggered to obtain the verification information from the application by using the obtaining module 602, or when the terminal receives, by using the server receiving module, a short message service message sent by the server, the obtaining module 602 may be triggered to obtain the verification information from the short message service message. Optionally, if receiving a short message service message including verification information, the terminal may further determine whether read of an incoming message number of the short message service message is allowed, or whether the incoming message number is in a communication whitelist of the terminal. If the read of the incoming message number of the short message service message is allowed, or the incoming message number is in the communication whitelist of the terminal, the terminal may extract the verification information from the short message service message of the incoming message number; or if the read of the incoming message number of the short message service message is not allowed, or the incoming message number is not in the communication whitelist of the terminal, the terminal may ignore the short message service message of the incoming message number, and certainly, may also query a user by using a prompt or in another manner whether to add the incoming call number to the whitelist. Once the user determines to add the incoming call number to the whitelist, the verification information is extracted from the short message service message of the incoming message number.

In an optional embodiment, the obtaining module may be configured to: obtain the verification information according to a set extraction keyword, where the extraction keyword is set according to a type or a source of the verification information.

The terminal may preset the extraction keyword by using the setting module, so as to obtain the verification information by using the extraction keyword according to a preset rule. The terminal may set the extraction keyword according to the type or the source of the verification information.

Exemplarily, the verification information may be of multiple types such as a short message service message verification code, a one-time-password, an identity card number, or a bank card number, and the setting module may set a different extraction keyword according to a different type of the verification information. For example, when the verification information is a short message service message verification code, the keyword may be set to a "verification code", a "check code", or the like, and a corresponding preset rule may be: extracting continuous n digits after the keyword as the verification information, or may be: extracting a combination of continuous digits and letters after the keyword as the verification information, or may be: extracting multiple segments of continuous digits and/or letters after the keyword, and then splicing the multiple segments of continuous digits and/or letters as the verification information. For another example, when the verification information is a bank card number, the keyword may be set to a "card number", an "account", a "credit card", or the like, and a corresponding preset rule may be: extracting continuous m digits after the keyword as the verification information, or may be: extracting a combination of continuous digits and letters after the keyword as the verification information, or may be: extracting multiple segments of continuous digits and/or letters after the keyword, and then splicing the multiple segments of continuous digits and/or letters as the verification information. Certainly, the present disclosure is not limited thereto.

Exemplarily, the verification information may also be a short message service message verification code sent from a different incoming message number, a one-time-password dynamically generated by an application (an application such as mobile phone Baoling that can generate a one-time-password), or the like, and the setting module may set a different extraction keyword according to a different source of the verification information. For example, if the incoming message number is a number of a bank A, the keyword is set to a keyword A such as a dynamic password, and a corresponding preset rule A is: extracting six continuous digits after the keyword as the verification information. For another example, if the incoming message number is a number of a bank B, the keyword is set to a keyword B such as a verification code, and a corresponding preset rule B: extracting multiple segments of continuous digits and/or letters after the keyword, and then splicing the multiple segments of continuous digits and/or letters as the verification information. In this way, when receiving a short message service message verification code sent by an incoming message number or a verification information obtaining request of auxiliary information: an incoming message number, the terminal may pertinently and quickly extract the verification code from a short message service message according to the incoming message number, and a corresponding keyword and a preset rule that are of the incoming message number, which can improve efficiency of extracting verification information to a certain extent.

It should be noted that the present disclosure is not limited to the foregoing setting method, and the setting module may also set unified extraction keywords for verification information of all types or from all sources. For example, a keyword database is created to store keywords such as a dynamic password, a one-time-password, a dynamic verification code, a dynamic key, and a verification code, and when detecting a keyword stored in the keyword database, the terminal may obtain verification information according to a preset rule, for example, extract digits or letters after the keyword or a combination of the digits or letters after the keyword, and the like.

The generation module 603 is configured to generate a verification information obtaining response, where the verification information obtaining response includes the verification information.

In an embodiment, after the terminal extracts the verification information, the generation module 703 may generate the verification information obtaining response including the verification information. Optionally, the terminal may generate a verification information obtaining response including a different piece of type indication information, so that the another terminal parses out corresponding verification information after receiving the verification information obtaining response and completes a corresponding verification operation. Optionally, the terminal may generate a corresponding verification information obtaining response according to a preset communications manner or even a working mode (such as a P2P working mode or CE working mode (that is, used as an NFC tag) of NFC communication) of a communications manner, so that the another terminal can receive the verification information obtaining response in a corresponding working mode.

In an embodiment, the terminal may receive, after generating the verification information obtaining response, the verification information obtaining request sent by the first terminal, or may receive the verification information obtaining request before obtaining the verification information and/or generating the verification information obtaining response.

In an optional embodiment, the terminal may further include a determining module, configured to: if the verification information obtaining request includes auxiliary information for determining a validity time of the verification information, determine, according to the auxiliary information, that the obtained verification information is within the validity time.

The auxiliary information may include the validity time of the verification information, and whether the verification information is invalid may be determined according to the auxiliary information. For example, after receiving a short message service message including verification information, the terminal determines whether a difference between a time of receiving a verification information obtaining request by the terminal and a time of starting extraction of a verification code in the short message service message is greater than a validity time (such as one minute) of the verification information. If the difference is greater than the validity time, the terminal needs to re-obtain verification information, and generate a new verification information obtaining response; otherwise, the terminal determines that the verification information is valid, and may directly feed back the verification information to the another terminal.

In addition, the terminal may determine, according to the validity time of the verification information, whether the verification information is already invalid. For example, after a user opens mobile phone Baoling of an Alipay client of a mobile phone, a second detection module determines whether a difference between a time of receiving a verification information obtaining request by the terminal and a time of starting extraction of a one-time-password is greater than or equal to a validity time (such as 30 seconds) of the verification information. If the difference is greater than or equal to the validity time, it is determined that the extracted verification information is already invalid, verification information is re-obtained, and a new verification information obtaining response is generated; otherwise, it is determined that the verification information is valid, and the verification information may be directly fed back to the first terminal.

The sending module 604 is configured to send, to the another terminal, the verification information obtaining response, so that the another terminal sends the verification information to a server, where the verification information is used for the server to verify the another terminal.

In an embodiment, the second terminal may send the generated verification information obtaining response to the first terminal, so that the first terminal may extract the verification information from the verification information obtaining response. The first terminal may send the verification information to the server, for verification on the first terminal. In this way, an entire verification process is completed.

In this embodiment of the present disclosure, the terminal receives a verification information obtaining request sent by the another terminal, obtains verification information, and may generate a verification information obtaining response including the verification information, and send the response to the first terminal, so that the another terminal sends the verification information to a server, where the verification information is used for the server to verify the another terminal. In this way, an input operation of a user is reduced, efficiency and accuracy of obtaining verification information are improved, and an interaction capability of terminals is enhanced.

Figure 7:
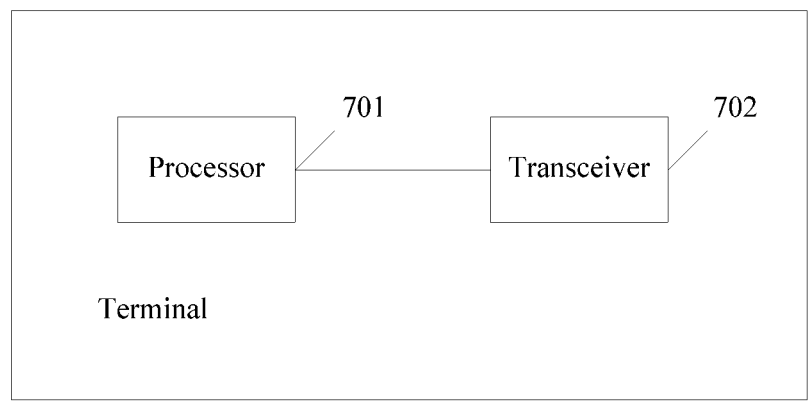
FIG. 7 is a structural diagram of still another terminal according to an embodiment of the present disclosure.

Refer to FIG. 7, which is a structural diagram of still another terminal according to an embodiment of the present disclosure. The terminal may include a processor 701 and a transceiver 702.

The processor 701 is configured to detect whether a condition for performing a verification operation is satisfied.

The processor 701 is further configured to generate a verification information obtaining request if the condition for performing a verification operation is satisfied, where the verification information obtaining request is used to request another terminal to feed back verification information.

The transceiver 702 is configured to send the verification information obtaining request to the another terminal.

The transceiver 702 is further configured to receive a verification information obtaining response returned by the another terminal, where the verification information obtaining response includes the verification information.

The transceiver 702 is further configured to send the verification information to a server, where the verification information is used for the server to verify the first terminal.

In an optional embodiment, before the transceiver 702 sends the verification information obtaining request to the another terminal, the processor 701 is further configured to: establish a near field communication connection to the second terminal, where the verification information obtaining request and the verification information obtaining response are sent by using the near field communication connection.

In an optional embodiment, the condition for performing a verification operation includes: an application needing to obtain verification information is opened; or a current display interface of the first terminal is an interface related to the verification operation; or a trigger instruction entered by a user is received, where the trigger instruction is used to trigger the first terminal to perform the verification operation; or an application that needs to obtain verification information by calling a wireless function is opened, and the application has call permission.

In an optional embodiment, the verification information obtaining request includes auxiliary information, where the auxiliary information is used for the second terminal to determine a message including the verification information, or determine a validity time of the verification information.

In an optional embodiment, the processor 701 is further configured to: before generating the verification information obtaining request, display a user interface including a verification window.

After the transceiver 702 receives the verification information obtaining response returned by the another terminal, the processor 701 is further configured to extract the verification information from the verification information obtaining response, and display the verification information in the verification window.

In an optional embodiment, the terminal may also include an apparatus such as a memory, a communications bus, an input apparatus, or an output apparatus. The input apparatus described in this embodiment of the present disclosure may include a keyboard, a mouse, a photoelectric input apparatus, a sound input apparatus, a touch input apparatus, a scanner, or the like. The output apparatus may include a display, a speaker, a printer, or the like. The memory may be a high-speed random access memory (RAM), or may be a non-volatile memory, such as at least one magnetic disk storage. Optionally, the memory may also be at least one storage apparatus far away from the foregoing processor. The processor may implement the foregoing operations by using program code stored in the memory. The transceiver may be used for data transmission with an external device. The communications bus is configured to implement connection and communication between the foregoing components.

In this embodiment of the present disclosure, when detecting that a condition for performing a verification operation is satisfied, the terminal may generate a verification information obtaining request, to request the another terminal to feed back verification information. Then, the terminal may automatically send the verification information obtaining request to the another terminal, and receive a verification information obtaining response returned by the another terminal, where the verification information obtaining response includes the verification information. The terminal may send the verification information to the server, so that the server may verify the terminal according to the verification information. In this way, an input operation of a user is reduced, efficiency and accuracy of obtaining verification information are improved, and an interaction capability of terminals is enhanced.

Figure 8:
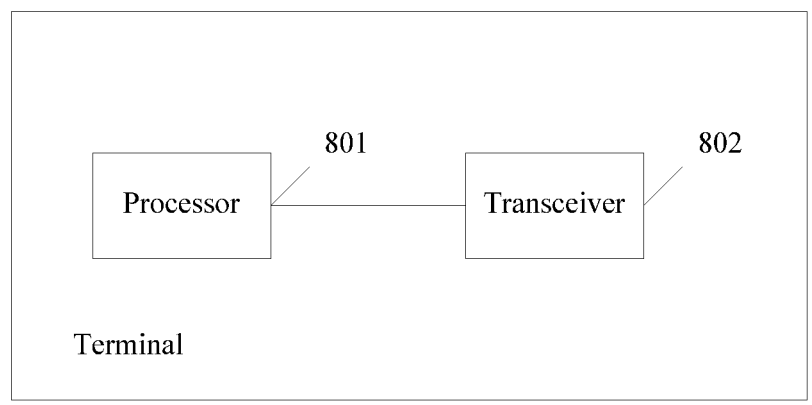
FIG. 8 is a structural diagram of still another terminal according to an embodiment of the present disclosure.

Refer to FIG. 8, which is a structural diagram of still another terminal according to an embodiment of the present disclosure. The terminal may include a processor 801 and a transceiver 802.

The transceiver 802 is configured to receive a verification information obtaining request sent by another terminal.

The processor 801 is configured to obtain verification information.

The processor 801 is further configured to generate a verification information obtaining response, where the verification information obtaining response includes the verification information.

The transceiver 802 is configured to send, to the another terminal, the verification information obtaining response, so that the another terminal sends the verification information to a server, where the verification information is used for the server to verify the another terminal.

In an optional embodiment, before obtaining the verification information, the processor 801 is further configured to: start an application generating the verification information; or receive a message that includes the verification information and that is sent by the server.

In an optional embodiment, before the transceiver 802 receives the verification information obtaining request sent by the another terminal, the processor 801 is further configured to: establish a near field communication connection to the another terminal, where the verification information obtaining request and the verification information obtaining response are sent by using the near field communication connection.

In an optional embodiment, a specific manner of obtaining the verification information by the processor 801 is: obtaining the verification information according to a set extraction keyword, where the extraction keyword is set according to a type or a source of the verification information.

In an optional embodiment, the verification information obtaining request includes auxiliary information for determining a validity time of the verification information; and before the transceiver 802 sends, to the another terminal, the verification information obtaining response, the processor is further configured to: determine, according to the auxiliary information, that the obtained verification information is within the validity time.

In an optional embodiment, the terminal may also include an apparatus such as a memory, a communications bus, an input apparatus, or an output apparatus. The input apparatus described in this embodiment of the present disclosure may include a keyboard, a mouse, a photoelectric input apparatus, a sound input apparatus, a touch input apparatus, a scanner, or the like. The output apparatus may include a display, a speaker, a printer, or the like. The memory may be high-speed RAM, or may be a non-volatile memory, such as at least one magnetic disk storage. Optionally, the memory may also be at least one storage apparatus far away from the foregoing processor. The processor may implement the foregoing operations by using program code stored in the memory. The transceiver may be used for data transmission with an external device. The communications bus 19 is configured to implement connection and communication between the foregoing components.

In this embodiment of the present disclosure, the terminal receives a verification information obtaining request sent by the another terminal, obtains verification information, and may generate a verification information obtaining response including the verification information, and send the response to the first terminal, so that the another terminal sends the verification information to a server, where the verification information is used for the server to verify the another terminal. In this way, an input operation of a user is reduced, efficiency and accuracy of obtaining verification information are improved, and an interaction capability of terminals is enhanced.

In an embodiment, this embodiment of the present disclosure further discloses a computer storage medium, where the computer storage medium can store a computer program, and when the computer program in the computer storage medium is read to a computer, the computer is made to complete some or all steps of the method for transmitting verification information disclosed in the embodiments of the present disclosure.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that all the embodiments described in this specification belong to exemplary embodiments, and the involved actions and modules are not necessarily mandatory to the present disclosure.

A person of ordinary skill in the art may understand that all or some of the steps of the methods in the embodiments may be implemented by a program instructing relevant hardware. The program may be stored in a computer-readable storage medium. The storage medium may include a flash memory, a read-only memory (ROM), a RAM, a magnetic disk, and an optical disc.

The interference elimination method and apparatus that are provided in the embodiments of the present disclosure are described in detail above. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A method for transmitting verification information, the method comprising:
   detecting, by a first user terminal, whether a verification operation condition is satisfied, the verification operation condition comprising a user click on a button enabling the first user terminal to obtain a short message service (SMS) message verification code via a near field communication (NFC) connection, the first user terminal being a personal computer;
   generating, by the first user terminal, a verification information obtaining request when the verification operation condition is satisfied;
   establishing, by the first user terminal, the NFC connection to a second user terminal, the second user terminal being a mobile phone, and the first user terminal and the second user terminal are associated with a same user;
   sending, by the first user terminal, the verification information obtaining request to the second user terminal, the verification information obtaining request being used to request the second user terminal to feedback verification information comprising the SMS message verification code to the first user terminal, the verification information obtaining request comprising auxiliary information to enable the second user terminal to receive a first SMS message from a server, the first SMS message enabling the second user terminal to obtain a second SMS message comprising the verification information from an inbox of the second user terminal according to an incoming message number, the auxiliary information enabling the second user terminal to determine a validity time of the verification information;
   receiving, by the first user terminal via the NFC connection, a verification information obtaining response from the second user terminal, the verification information obtaining response comprising the verification information; and
   sending, by the first user terminal to the server, the verification information to enable the server to verify the first user terminal.

2. The method of claim 1, wherein the verification operation condition comprises:
   opening an application needing to acquire verification information;
   displaying a current display interface of the first user terminal related to the verification operation condition;
   receiving a trigger instruction entered by the same user to trigger the first user terminal to perform the verification operation condition; or
   opening an application that needs the verification information by calling a wireless function, and the application has call permission.

3. The method of claim 1, wherein the verification information obtaining request comprises the auxiliary information enabling the second user terminal to determine the second SMS message comprising the verification information.

4. The method of claim 1, wherein the method further comprises:
   displaying, by the first user terminal, a user interface comprising a verification window;
   extracting, by the first user terminal, the verification information from the verification information obtaining response after receiving the verification information obtaining response from the second user terminal; and
   displaying the verification information in the verification window.

5. A user terminal, comprising:
   a non-transitory memory comprising instructions; and
   a processor coupled to the non-transitory memory and configured to execute the instructions, the instructions causing the processor to be configured to:
      detect whether a verification operation condition is satisfied, the verification operation condition comprising a user click on a button enabling the user terminal to obtain a short message service (SMS) message verification code via a near field communication (NFC) connection, the user terminal being a personal computer; and
      generate a verification information obtaining request in response when the verification operation condition is satisfied; and
   a transceiver coupled to the processor and configured to:
      establish the NFC connection to another user terminal, the other user terminal being a mobile phone, the user terminal and the other user terminal are associated with a same user;
      send the verification information obtaining request to the other user terminal via the NFC connection, the verification information obtaining request being used to request the other user terminal to feedback verification information comprising the SMS message verification code to the user terminal, the verification information obtaining request comprising auxiliary information to enable the other user terminal to receive a first SMS message from a server, the first SMS message enabling the other user terminal to obtain a second SMS message comprising the verification information from an inbox of the other user terminal according to an incoming message number, the auxiliary information enabling the other user terminal to determine a validity time of the verification information;
      receive a verification information obtaining response from the other user terminal via the NFC connection, the verification information obtaining response comprising the verification information; and
      send the verification information to the server, the verification information enabling the server to verify the user terminal.

6. The user terminal of claim 5, wherein the instructions further cause the processor to detect the verification operation condition comprises:
   an application needing to obtain verification information is opened;
   a current display interface of the user terminal is an interface related to the verification operation condition;

a trigger instruction entered by a user is received, the trigger instruction being used to trigger the user terminal to perform the verification operation condition; or an application needing to obtain verification information is opened, and the application needing to obtain verification information has call permission.

7. The user terminal of claim 5, wherein the the auxiliary information is used for the other user terminal to determine a message comprising the verification information.

8. The user terminal of claim 5, wherein the instructions further cause the processor to be configured to:
 display a user interface comprising a verification window;
 extract the verification information from the verification information obtaining response; and
 display the verification information in the verification window.

9. The user terminal of claim 5, wherein the instructions further cause the processor to detect the verification operation condition, comprising:
 an application obtaining the verification information is opened;
 a display interface of the user terminal is displayed in an interface related to the verification operation condition;
 an application that needs the verification information by calling a wireless function, and the application has call permission or
 a trigger instruction entered by the same user to trigger the user terminal to perform the verification operation condition.

10. The user terminal of claim 5, wherein the instructions further cause the processor to be configured to:
 display a user interface comprising a verification window;
 extract the verification information from the verification information obtaining response after receiving the verification information obtaining response from the other user terminal; and
 display the verification information in the verification window.

11. A user terminal, comprising:
 a non-transitory memory comprising instructions; and
 a processor coupled to the non-transitory memory and configured to execute the instructions, wherein the instructions cause the processor to be configured to:
  establish a near field communication (NFC) connection to another user terminal;
  receive, via the NFC connection, a verification information obtaining request from the other user terminal to indicate a verification operation condition, wherein the verification operation condition comprises a user click on a button enabling the other user terminal to obtain a short message service (SMS) message verification code via the NFC connection, wherein the other user terminal is a personal computer and the user terminal is a mobile phone, wherein the user terminal and the other user terminal are associated with a same user, wherein the verification information obtaining request is used to request the user terminal to feedback verification information comprising the SMS message verification code to the other user terminal, wherein the verification information obtaining request comprises auxiliary information to enable the user terminal to receive a first SMS message from a server, wherein the first SMS message enables the user terminal to obtain a second SMS message comprising the verification information from an inbox of the user terminal according to an incoming message number, wherein the auxiliary information enables the user terminal to determine a validity time of the verification information;
  obtain the verification information from the server;
  generate a verification information obtaining response comprising the verification information; and
  send, to the other user terminal, the verification information obtaining response comprising the verification information via the NFC connection, and wherein the verification information is used by the server to verify the other user terminal.

12. The user terminal of claim 11, wherein the instructions further cause the processor to receive the second SMS message comprising the verification information from the server.

13. The user terminal of claim 11, wherein the instructions further cause the processor to obtain the verification information according to an extraction keyword set according to a type or a source of the verification information.

14. The user terminal of claim 11, wherein the instructions further cause the processor to determine that the obtained verification information is within the validity time prior to sending the verification information obtaining response.

* * * * *